(12) United States Patent
Kooiman et al.

(10) Patent No.: US 9,663,225 B1
(45) Date of Patent: May 30, 2017

(54) MAINTAINING DRIVE SYSTEM ALIGNMENT IN TILTROTOR AIRCRAFT

(71) Applicant: Bell Helicopter Textron Inc., Fort Worth, TX (US)

(72) Inventors: James Everett Kooiman, Fort Worth, TX (US); George Ryan Decker, Fort Worth, TX (US); Andrew G. Baines, Fort Worth, TX (US); David R. Bockmiller, Fort Worth, TX (US); Erick Wayne Kohler, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 15/417,113

(22) Filed: Jan. 26, 2017

Related U.S. Application Data

(63) Continuation-in-part of application No. 13/966,726, filed on Aug. 14, 2013.

(51) Int. Cl.
    *B64C 29/00* (2006.01)
    *B64F 5/40* (2017.01)

(52) U.S. Cl.
    CPC ............ *B64C 29/0033* (2013.01); *B64F 5/40* (2017.01)

(58) Field of Classification Search
    CPC . B64C 27/22; B64C 29/0033; Y10T 74/1966; Y10T 29/49318; B64F 5/0081
    See application file for complete search history.

(56) References Cited

U.S. PATENT DOCUMENTS

| | | |
|---|---|---|
| 2,814,451 A | 11/1957 | Turner et al. |
| 2,936,967 A | 5/1960 | Dancik |
| 2,936,968 A | 5/1960 | Mazzitelli |
| 3,065,929 A | 11/1962 | Holland |
| 3,259,343 A | 7/1966 | Ropes |
| 3,284,027 A | 11/1966 | Marc |
| 3,360,217 A | 12/1967 | Trotter |
| 3,797,783 A | 3/1974 | Kisovec |
| 4,136,845 A | 1/1979 | Eickmann |
| 4,142,697 A | 3/1979 | Fradenburgh |
| 4,436,261 A | 3/1984 | Koleff |
| 4,496,120 A | 1/1985 | Eickmann |
| 4,682,512 A | 7/1987 | Peterson |
| 4,783,023 A | 11/1988 | Jupe |
| 4,979,698 A | 12/1990 | Lederman |
| 5,054,716 A | 10/1991 | Wilson |

(Continued)

*Primary Examiner* — Valentina Xavier
(74) *Attorney, Agent, or Firm* — Lawrence Youst PLLC

(57) ABSTRACT

A drive system for a tiltrotor aircraft includes a first gearbox rotatably mounted to the airframe and rotatable about a longitudinal axis to operate the tiltrotor aircraft between helicopter and airplane modes. A second gearbox extends generally normal to the longitudinal axis of the first gearbox. A common shaft, rotatable about the longitudinal axis, transfers torque from an output gear of the second gearbox to an input gear of the first gearbox. A support assembly couples the second gearbox to the airframe and includes a fixed joint proximate the longitudinal axis, a first directional reacting joint remote from the longitudinal axis providing a first radial growth degree of freedom to the second gearbox and a second directional reacting joint remote from the longitudinal axis providing a second radial growth degree of freedom to the second gearbox that is not parallel with the first radial growth degree of freedom.

20 Claims, 10 Drawing Sheets

(56) References Cited

U.S. PATENT DOCUMENTS

| | | |
|---|---|---|
| 5,085,315 A | 2/1992 | Sambell |
| 5,645,250 A | 7/1997 | Gevers |
| 6,030,177 A | 2/2000 | Hager |
| 6,260,793 B1 | 7/2001 | Balayn et al. |
| 6,276,633 B1 | 8/2001 | Balayn et al. |
| 6,367,736 B1 | 4/2002 | Pancotti |
| 6,607,161 B1 | 8/2003 | Krysinski et al. |
| 6,843,447 B2 | 1/2005 | Morgan |
| 6,974,105 B2 | 12/2005 | Pham |
| 7,520,041 B1 | 4/2009 | Aguilar |
| 7,584,923 B2 | 9/2009 | Burrage |
| 7,866,598 B2 | 1/2011 | Waide et al. |
| 7,871,033 B2 | 1/2011 | Karem et al. |
| 7,874,513 B1 | 1/2011 | Smith |
| 7,913,947 B2 | 3/2011 | Haynes et al. |
| 8,152,096 B2 | 4/2012 | Smith |
| 8,251,305 B2 | 8/2012 | Smith et al. |
| 8,276,840 B2 | 10/2012 | Karem |
| 8,567,709 B2 | 10/2013 | Smith et al. |
| 8,733,690 B2 | 5/2014 | Bevirt et al. |
| 9,126,678 B2 | 9/2015 | Ross et al. |
| 9,174,731 B2 | 11/2015 | Ross et al. |
| 9,376,206 B2 | 6/2016 | Ross et al. |
| 2004/0038768 A1 | 2/2004 | Thomassey et al. |
| 2005/0045762 A1 | 3/2005 | Pham |
| 2005/0127238 A1 | 6/2005 | Ballew |
| 2007/0102573 A1 | 5/2007 | Goto |
| 2007/0158494 A1 | 7/2007 | Burrage |
| 2007/0205325 A1 | 9/2007 | Waide |
| 2009/0227415 A1 | 9/2009 | Buelna |
| 2010/0276549 A1 | 11/2010 | Karem |
| 2010/0327123 A1 | 12/2010 | Smith et al. |
| 2011/0114797 A1 | 5/2011 | Karem |
| 2012/0199699 A1 | 8/2012 | Isaac et al. |
| 2014/0034781 A1 | 2/2014 | Kouros et al. |
| 2015/0048214 A1 | 2/2015 | Bockmiller et al. |

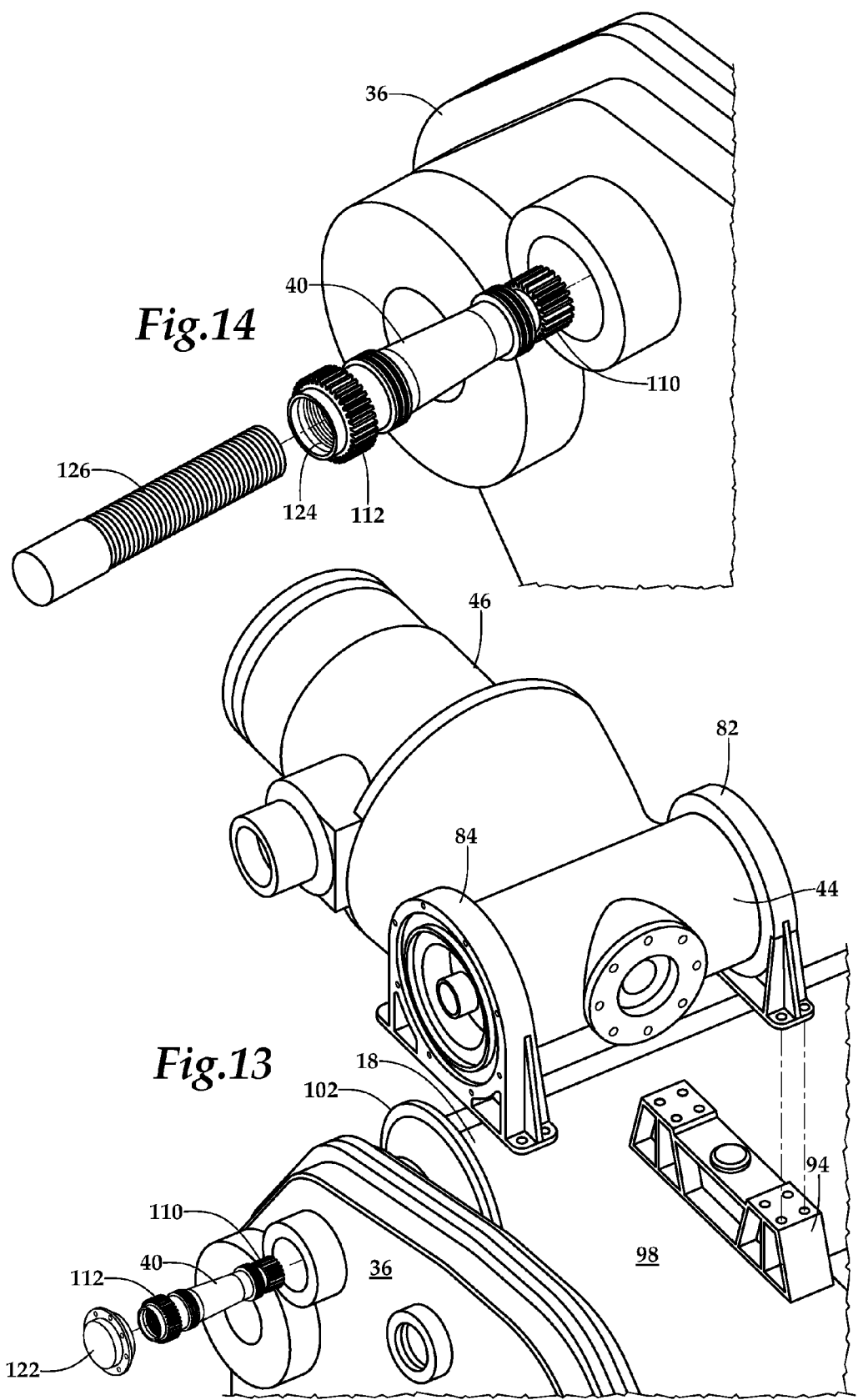

MAINTAINING DRIVE SYSTEM ALIGNMENT IN TILTROTOR AIRCRAFT

CROSS-REFERENCE TO RELATED APPLICATIONS

This is a continuation-in-part of co-pending application Ser. No. 13/966,726 filed Aug. 14, 2013.

TECHNICAL FIELD OF THE DISCLOSURE

The present disclosure relates, in general, to tiltrotor aircraft operable for vertical takeoff and landing in a helicopter mode and forward cruising in an airplane mode and, in particular, to tiltrotor aircraft having a fixed engine and rotatable pylon assembly implementation.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It have been found, however, that the outboard location of the nacelles coupled with the requirement of rotating the nacelles significantly influence the size and weight of the airframe structure required to support the nacelles. Accordingly, a need has arisen for improved systems and methods for realizing a tiltrotor aircraft having reduced structural loads generated by the propulsion system.

SUMMARY

In a first aspect, the present disclosure is directed to a drive system for a tiltrotor aircraft. The drive system includes a first gearbox rotatably coupled to the airframe of the tiltrotor aircraft and rotatable about a longitudinal axis to selectively operate the tiltrotor aircraft between a helicopter mode and an airplane mode. A second gearbox extends generally normal to the longitudinal axis of the first gearbox. A common shaft is configured to transfer torque from an output gear of the second gearbox to an input gear of the first gearbox. The common shaft is rotatable about the longitudinal axis. A support assembly couples the second gearbox to the airframe. The support assembly includes a fixed joint proximate the longitudinal axis, a first directional reacting joint remote from the longitudinal axis providing a first radial growth degree of freedom to the second gearbox relative to the longitudinal axis and a second directional reacting joint remote from the longitudinal axis providing a second radial growth degree of freedom to the second gearbox relative to the longitudinal axis. The first radial growth degree of freedom is not parallel with the second radial growth degree of freedom. The support assembly maintains the output gear of the second gearbox in substantial collinear alignment with the input gear of the first gearbox.

In some embodiments, the fixed joint may be a bolted connection, the first directional reacting joint may be an A-frame connector having spherical elements generally normal to the first radial growth degree of freedom of the second gearbox and/or the second directional reacting joint may be an A-frame connector having spherical elements generally normal to the second radial growth degree of freedom of the second gearbox. In certain embodiments, the fixed joint, the first directional reacting joint and the second directional reacting joint may provide lateral support to the second gearbox, the fixed joint and the first directional reacting joint may provide support to the second gearbox in a direction generally parallel to the second radial growth degree of freedom and/or the fixed joint and the second directional reacting joint may provide support to the second gearbox in a direction generally parallel to the first radial growth degree of freedom.

In some embodiments, the first radial growth degree of freedom may be a first thermal growth degree of freedom and/or the second radial growth degree of freedom may be a second thermal growth degree of freedom. In certain embodiments, the first radial growth degree of freedom may be generally normal to the second radial growth degree of freedom. For example, the first radial growth degree of freedom may be generally in a fore/aft direction and the second radial growth degree of freedom may be generally in a vertical direction. In some embodiments, the support assembly may maintain the output gear of the second gearbox in substantial collinear alignment with the input gear of the first gearbox throughout thermal expansion cycles of the second gearbox.

In a second aspect, the present disclosure is directed to a tiltrotor aircraft having a helicopter mode and an airplane mode. The tiltrotor aircraft includes an airframe including a fuselage and a wing. An engine is supported by the airframe proximate an outboard end of the wing. A pylon assembly is coupled to the airframe inboard of the engine and above the wing. The pylon assembly includes a spindle gearbox having an input gear, a mast and a proprotor assembly operable to rotate with the mast. The spindle gearbox is rotatable about a conversion axis to selectively operate the tiltrotor aircraft between the helicopter mode and the airplane mode. A fixed gearbox is operably coupled to the engine and has an output gear. The fixed gearbox extends generally normal to the conversion axis of the spindle gearbox. A common shaft is configured to transfer torque from the output gear of the fixed gearbox to the input gear of the spindle gearbox. The common shaft is rotatable about the conversion axis. A support assembly couples the fixed gearbox to the airframe. The support assembly includes a fixed joint proximate the conversion axis, a first directional reacting joint remote from the conversion axis providing a first radial growth degree of freedom to the fixed gearbox relative to the conversion axis and a second directional reacting joint remote from the conversion axis providing a second radial growth degree of freedom to the fixed gearbox relative to the longitudinal axis. The first radial growth degree of freedom is not parallel with the second radial growth degree of freedom. The support assembly maintains the output gear of the fixed gearbox in substantial collinear alignment with the input gear of the spindle gearbox.

In a third aspect, the present disclosure is directed to a method of maintaining substantial collinear alignment throughout thermal expansion cycles of a drive system of a tiltrotor aircraft having a helicopter mode and an airplane mode. The method includes rotatably coupled a first gearbox to an airframe such that the first gearbox is rotatable about a longitudinal axis to selectively operate the tiltrotor aircraft between the helicopter mode and the airplane mode; positioning a second gearbox generally normal to the longitudinal axis of the first gearbox; transferring torque from an output gear of the second gearbox to an input gear of the first gearbox with a common shaft rotatable about the longitudinal axis; and coupling the second gearbox to the airframe with a fixed joint proximate the longitudinal axis, a first directional reacting joint remote from the longitudinal axis providing a first radial growth degree of freedom to the second gearbox relative to the longitudinal axis and a second directional reacting joint remote from the longitudinal axis providing a second radial growth degree of freedom to the second gearbox relative to the longitudinal axis, thereby maintaining the output gear of the second gearbox in substantial collinear alignment with the input gear of the first gearbox throughout thermal expansion cycles of the second gearbox.

The method may also include providing lateral support to the second gearbox with the fixed joint, the first directional reacting joint and the second directional reacting joint; providing support to the second gearbox in a direction generally parallel to the second radial growth degree of freedom with the fixed joint and the first directional reacting joint and providing support to the second gearbox in a direction generally parallel to the first radial growth degree of freedom with the fixed joint and the second directional reacting joint.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 13 is a perspective view of a propulsion system section of a tiltrotor aircraft in a partially disassembled state in accordance with embodiments of the present disclosure;

FIG. 14 is a perspective view of a propulsion system section of a tiltrotor aircraft in a partially disassembled state in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
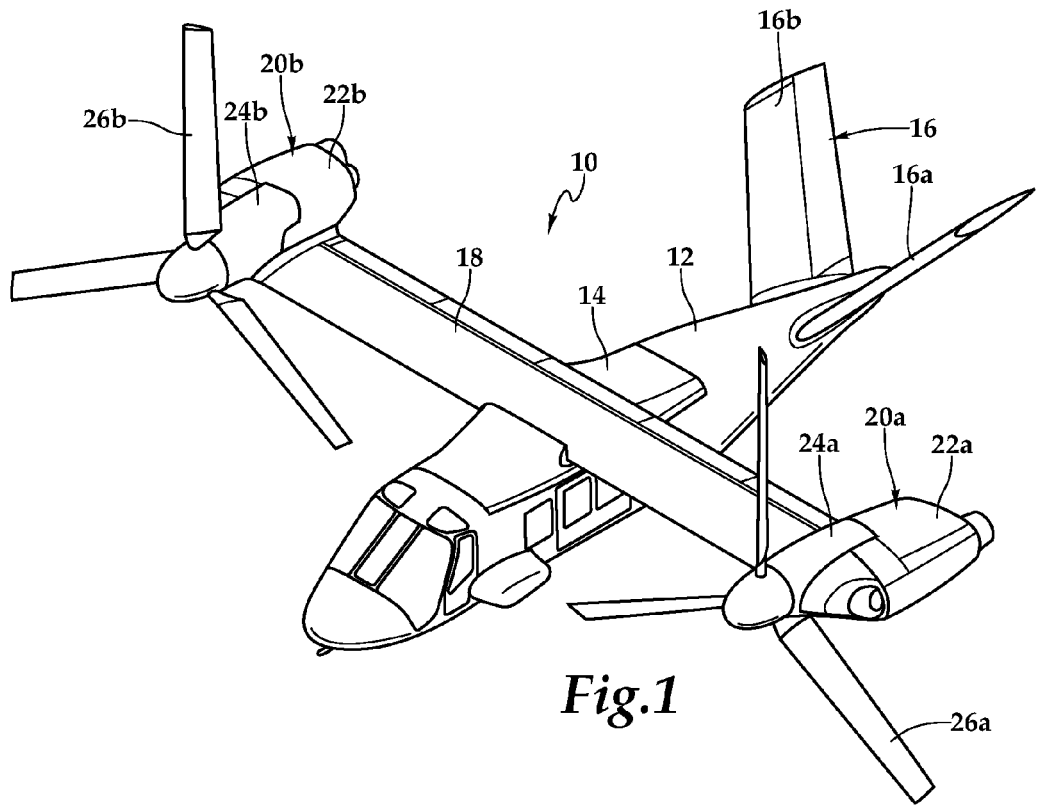
FIG. 1 is a perspective view of a tiltrotor aircraft in airplane mode in accordance with embodiments of the present disclosure.
Figure 2:
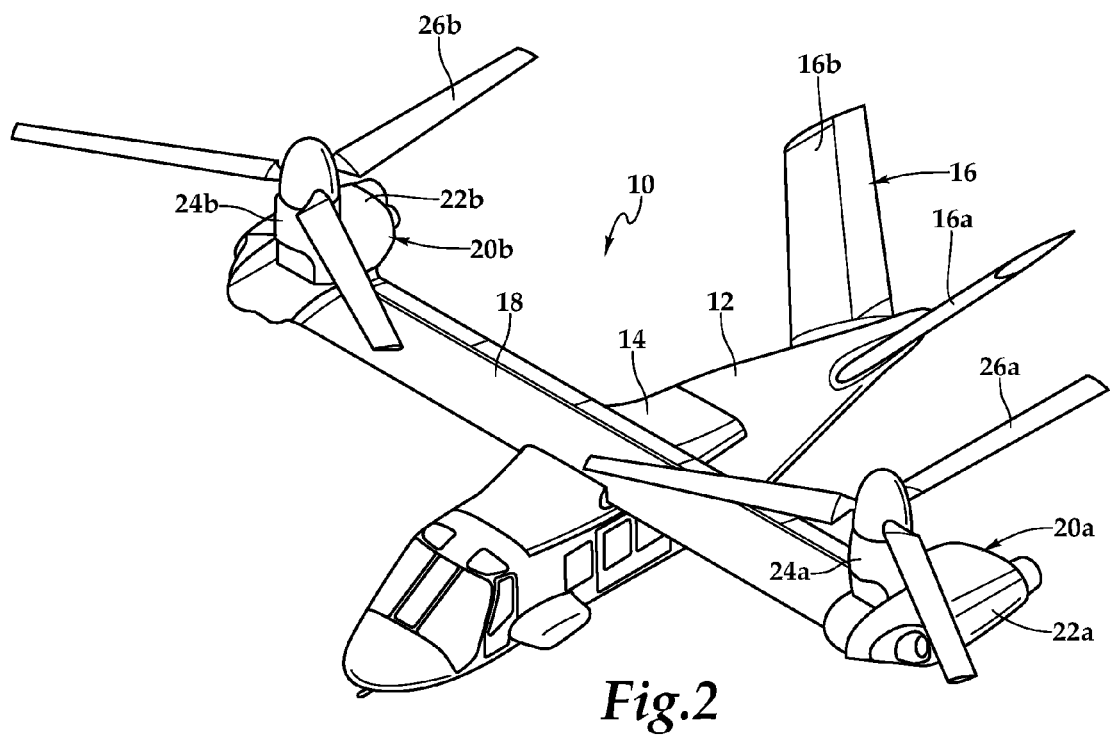
FIG. 2 is a perspective view of a tiltrotor aircraft in helicopter mode in accordance with embodiments of the present disclosure.
Figure 3:
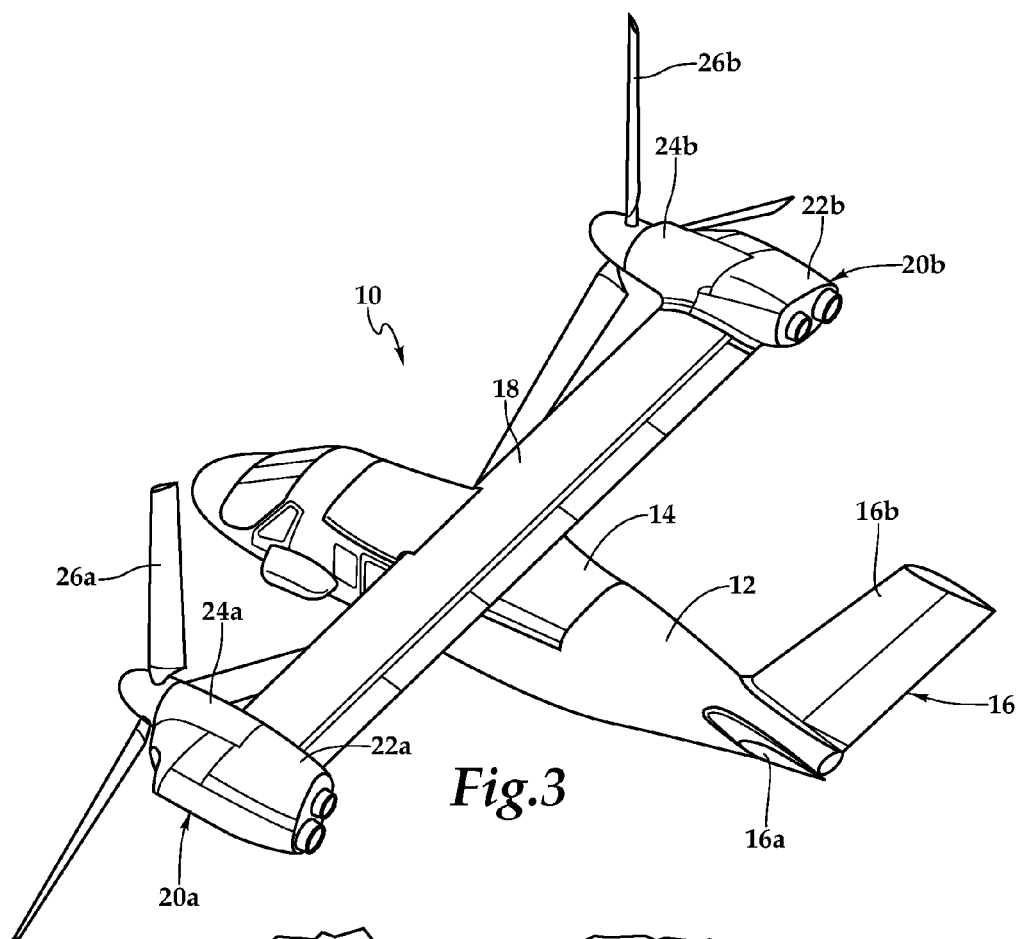
FIG. 3 is a perspective view of a tiltrotor aircraft in airplane mode in accordance with embodiments of the present disclosure.

Referring to FIGS. 1-3 in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally horizontal orientation, as best seen in FIG. 1, a generally vertical orientation, as best seen in FIG. 2. Pylon assembly 24a includes a rotatable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally horizontal orientation, as best seen in FIG. 1, a generally vertical orientation, as best seen in FIG. 2. Pylon assembly 24b includes a rotatable portion of the drive system and a proprotor assembly 26b that is rotatable responsive to torque and rotational energy provided via the engine and drive system.

FIGS. 1 and 3 illustrate aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 2 illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between airplane mode and helicopter mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having a single engine which may be housed within one of the fixed nacelles or within the fuselage that provides torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that even though propulsion systems 20a, 20b are illustrated in the context of tiltrotor aircraft 10, the propulsion systems of the present disclosure can be implemented on other types of tiltrotor aircraft including, for example, quad tiltrotor aircraft and unmanned tiltrotor aircraft, to name a few.

Referring now to FIGS. 4-11, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36. Fixed gearbox 36 includes a plurality of gears, such as helical gears, in a gear train that are coupled to an interconnect drive shaft 38 and a common shaft depicted as quill shaft 40. Torque is transferred to an input gear 42 in spindle gearbox 44 of proprotor gearbox 46 through quill shaft 40.

Figure 8:
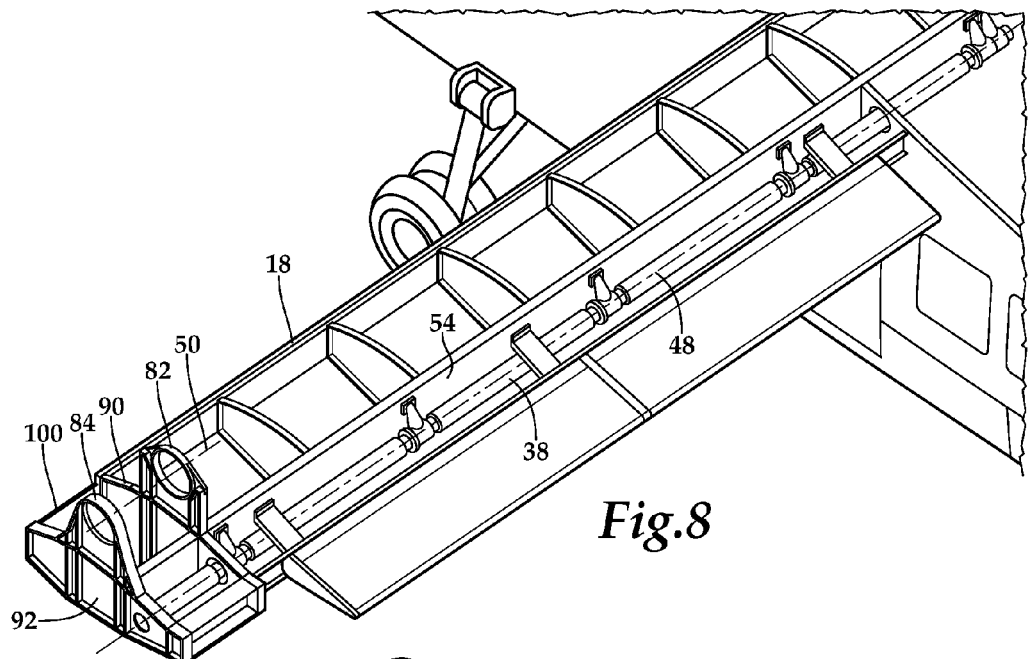
FIG. 8 is a perspective view a wing section of a tiltrotor aircraft in accordance with embodiments of the present disclosure.
Figure 9:
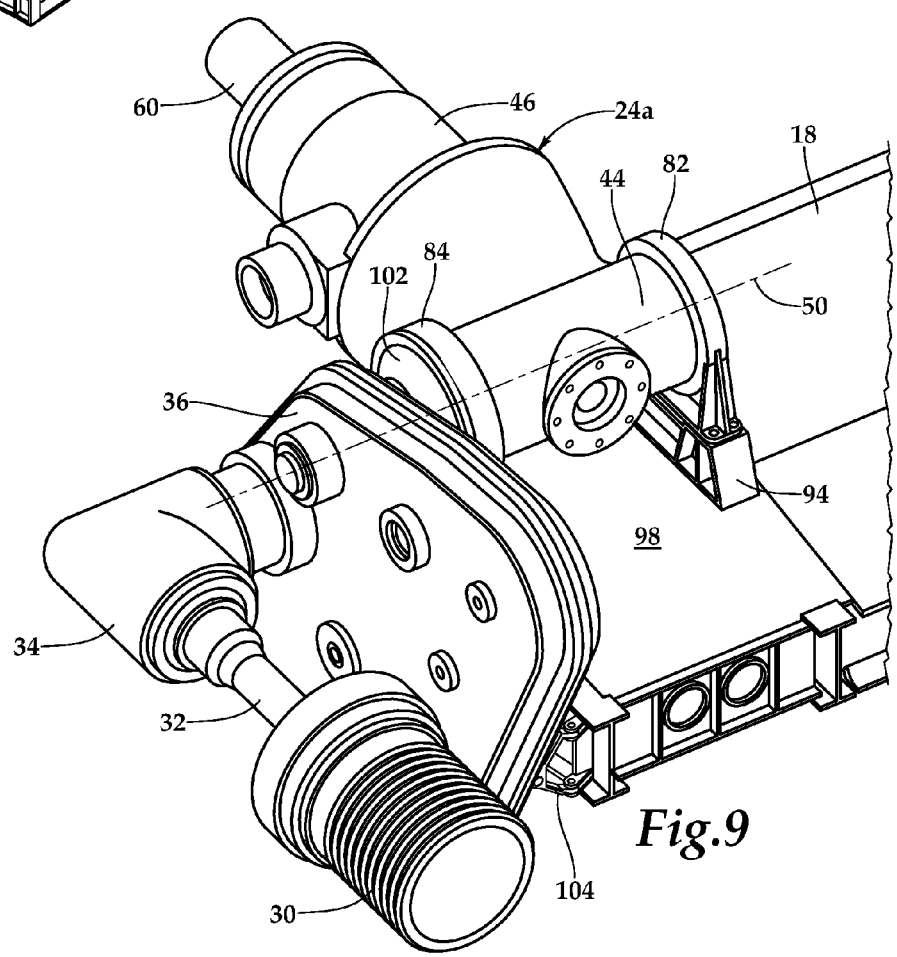
FIG. 9 is a perspective view of a propulsion system of a tiltrotor aircraft in accordance with embodiments of the present disclosure.
Figure 10:
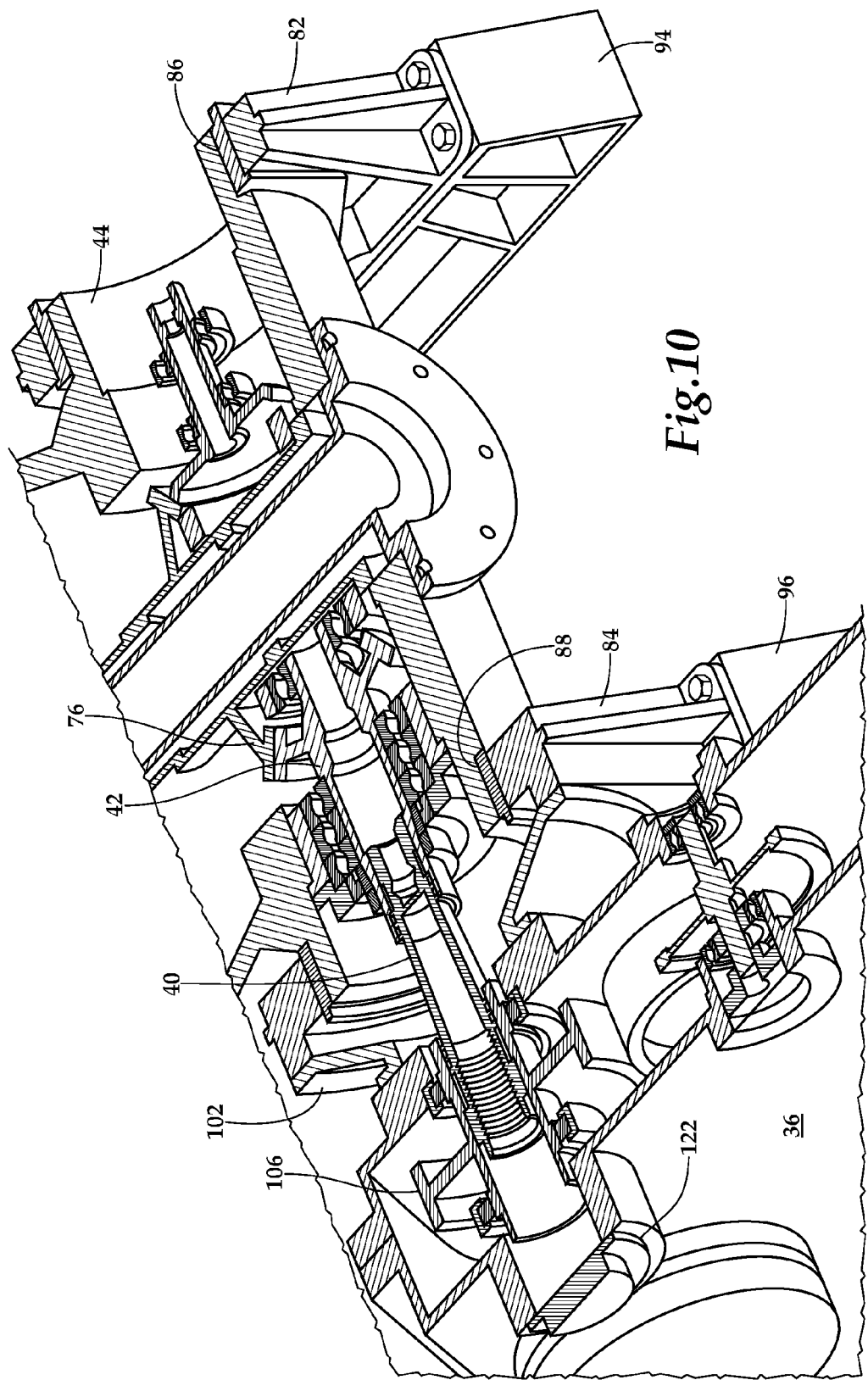
FIG. 10 is a cross sectional view of a propulsion system section of a tiltrotor aircraft in accordance with embodiments of the present disclosure.

Interconnect drive shaft 38 provides a torque path that enables a single engine to provide torque to both proprotors assemblies 26a, 26b in the event of a failure of the other engine. In the illustrated embodiment, interconnect drive shaft 38 has a rotational axis 48 that is vertically lower and horizontally aft of a longitudinal axis of the spindle gearbox 44 referred to herein as a conversion axis 50. Conversion axis 50 is parallel to a lengthwise axis 52 of wing 18. Referring in particular to FIG. 8, interconnect drive shaft 38 includes a plurality of segments that share rotational axis 48. Locating interconnect drive shaft 38 aft of wing spar 54, which is a structural member of the airframe of tiltrotor aircraft 10, provides for optimal integration with fixed gearbox 36 without interfering with the primary torque transfer of quill shaft 40 between fixed gearbox 36 and spindle gearbox 44. Conversion axis 50 of spindle gearbox 44 is parallel to rotational axis 48 of interconnect drive shaft 38 but located forward and above rotational axis 48.

Figure 4:
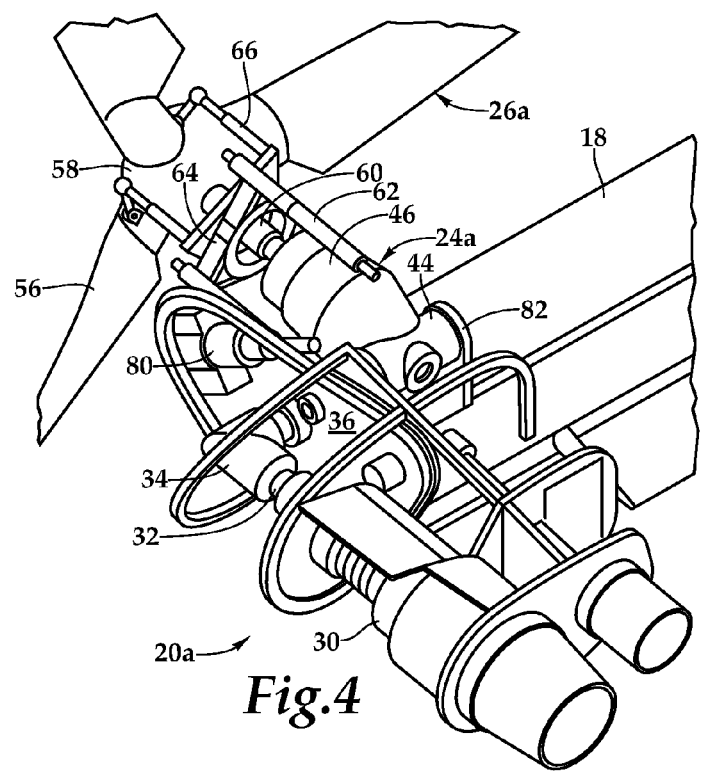
FIG. 4 is a perspective view of a propulsion system of a tiltrotor aircraft in accordance with embodiments of the present disclosure.

As best seen in FIG. 4, proprotor assembly 26a of propulsion system 20a includes a plurality of proprotor blades 56 coupled to a yoke 58 that is coupled to a mast 60. As used herein, the term "coupled" may include direct or indirect coupling by any means, including moving and/or non-moving mechanical connections. Mast 60 is coupled to proprotor gearbox 46. The collective and/or cyclic pitch of proprotor blades 56 may be controlled responsive to pilot input via actuators 62, swashplate 64 and pitch links 66.

Figure 5:
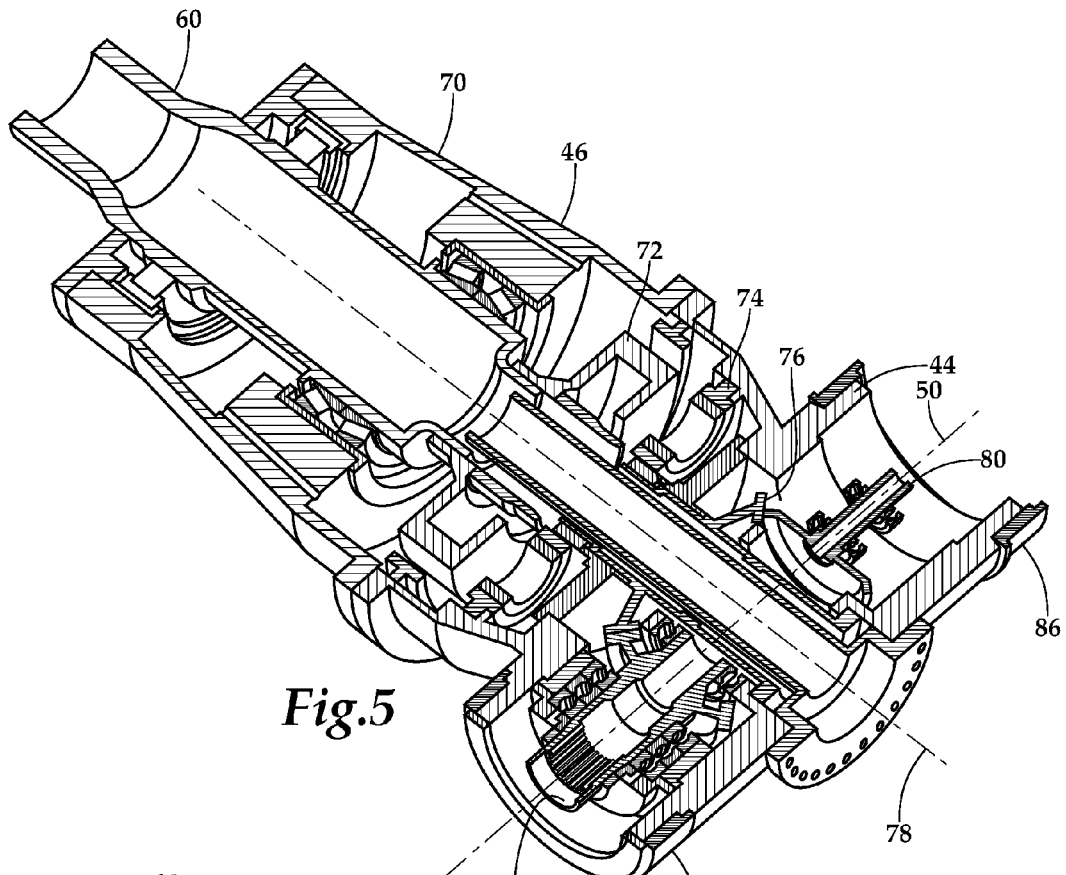
FIG. 5 is a cross sectional view of a pylon assembly of a tiltrotor aircraft in accordance with embodiments of the present disclosure.
Figure 6:
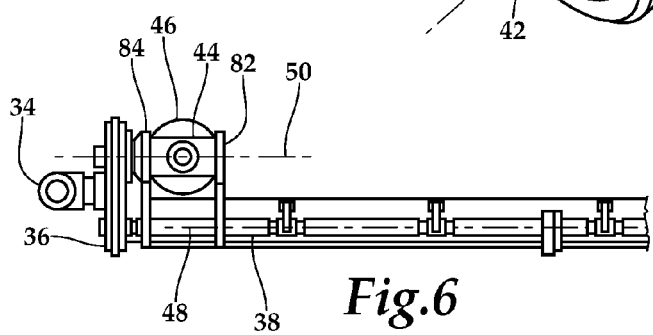
FIG. 6 is an aft view of a propulsion system and wing section of a tiltrotor aircraft in accordance with embodiments of the present disclosure.
Figure 7:
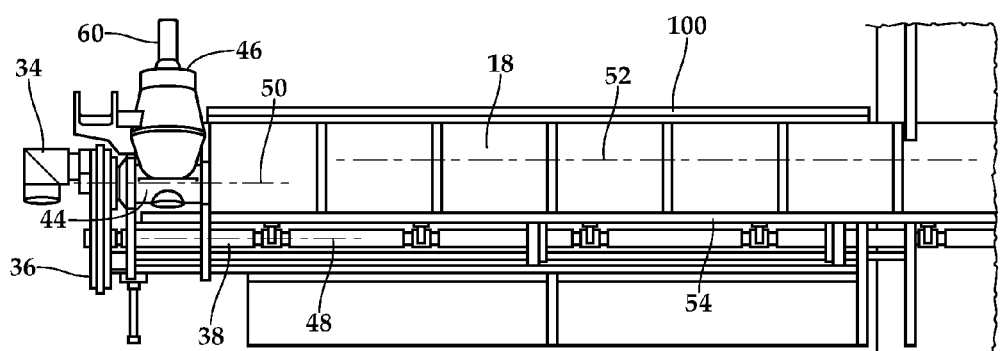
FIG. 7 is a top view of a propulsion system and wing section of a tiltrotor aircraft in accordance with embodiments of the present disclosure.

Referring in particular to FIG. 5, proprotor gearbox 46 is configured to transfer power and reduce speed to mast 60. Proprotor gearbox 46 includes a top case portion 70 and spindle gearbox 44. Speed reduction is accomplished by a low speed planetary gear assembly 72 and a high speed planetary gear assembly 74. A spiral bevel gear assembly includes spiral bevel input gear 42 and a spiral bevel output gear 76. The spiral bevel gear assembly changes power direction from along longitudinal axis 50 of spiral bevel input gear 42 to a centerline axis 78 of spiral bevel output gear 76. An accessory drive 80 can be coupled to spiral bevel output gear 76. It should be appreciated that proprotor gearbox 46 can include additional or different components including bearing systems, lubrication systems and other gearbox related systems that may be beneficial for operation.

During operation, a conversion actuator 80, as best seen in FIG. 4, can be actuated so as to selectively rotate proprotor gearbox 46 and thus pylon assembly 24a about conversion axis 50, which in turn selectively positions proprotor assembly 26a between helicopter mode, as best seen in FIG. 2, and airplane mode, as best seen in FIGS. 1 and 3. The operational loads, such as thrust loads, are transmitted through mast 60 and into spindle gearbox 44 of proprotor gearbox 46 and thus the structural support of spindle gearbox 44 is critical. In the illustrated embodiment, spindle gearbox 44 is rotatably coupled to the airframe of tiltrotor aircraft 10 by mounting spindle gearbox 44 to an inboard pedestal depicted as inboard pillow block 82 having an inboard bearing assembly 86 and an inboard pedestal depicted as outboard pillow block 84 with an outboard bearing assembly 88. Thus, spindle gearbox 44 is structurally supported and is operable to be rotated about conversion axis 50 by conversion actuator 80.

Inboard pillow block 82 is structurally coupled to an inboard tip rib 90. Similarly, outboard pillow block 84 is structurally coupled to an outboard tip rib 92. Inboard tip rib 90 and outboard tip rib 92 are structural members of the airframe of tiltrotor aircraft 10. In the illustrated embodiment, the inboard pedestal includes an inboard intermediate support 94 that is utilized as a structural element between inboard pillow block 82 and inboard tip rib 90. Likewise, the outboard pedestal includes an outboard intermediate support 96 that is utilized as a structural element between outboard pillow block 84 and outboard tip rib 92. It should be appreciated that the exact structural configuration is implementation specific, and that structural components can be combined and/or separated to meet implementation specific requirements. For example, in certain implementations, airframe structures such as tip ribs 90, 92 may extend above wing 18 and form a portion the inboard and outboard pedestals.

Figure 11:
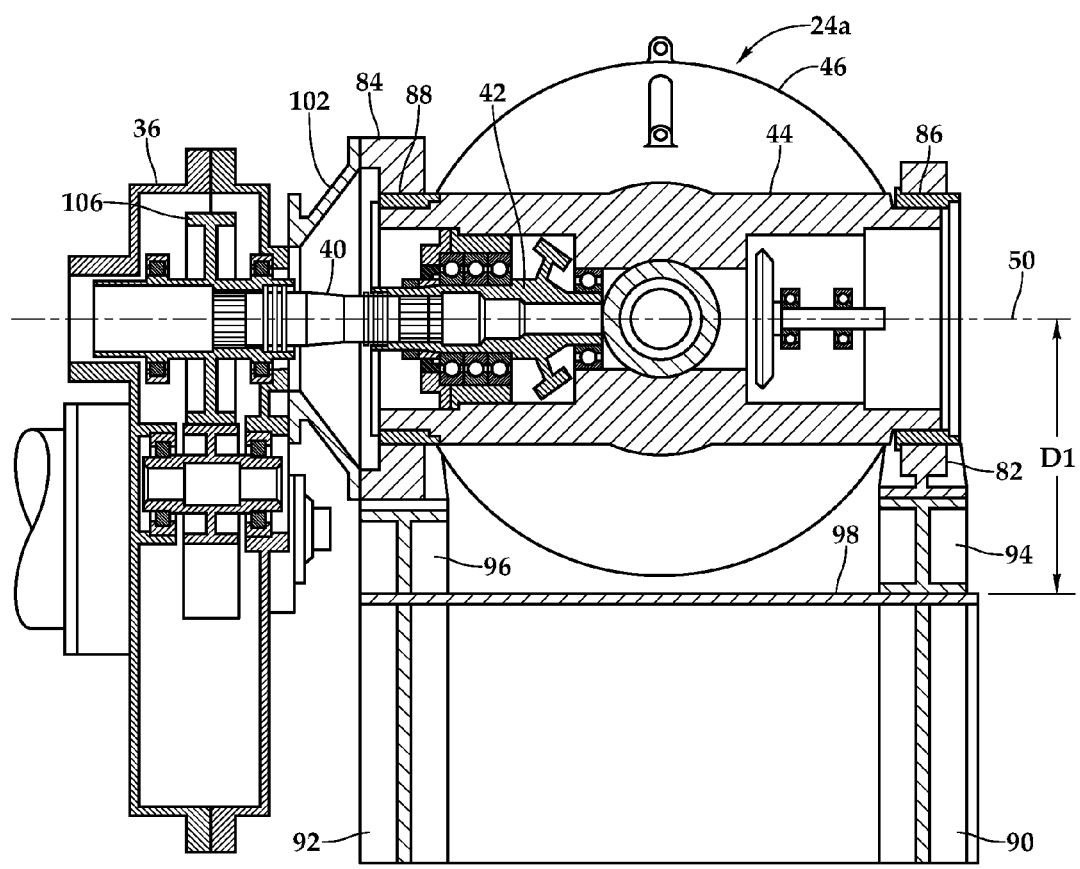
FIG. 11 is a cross sectional view of a propulsion system section of a tiltrotor aircraft in accordance with embodiments of the present disclosure.

Pylon assembly 24a including proprotor gearbox 46 and spindle gearbox 44 is located above a surface of an upper wing skin 98 such that conversion axis 50 is at a distance D1 above upper wing skin 98, as best seen in FIG. 11. In addition, pylon assembly 24a is generally centered between inboard tip rib 90 and outboard tip rib 92. One advantage of locating pylon assembly 24a above the surface of upper wing skin 98 is that the fore/aft location of pylon assembly 24a can be easily tailored to align the aircraft center of gravity (CG) with conversion axis 50 while pylon assembly 24a is in helicopter mode, while also aligning the aircraft center of gravity (CG) with the wing aerodynamic center of lift while pylon assembly 24a is in airplane mode. It is noted that the aircraft center of gravity (CG) shifts as pylon assembly 24a rotates between helicopter mode and airplane mode. As such, locating pylon assembly 24a above the wing allows the exact fore/aft location to be optimized, while also structurally attaching pylon assembly 24a to a portion of the airframe in the form of a torque box defined by forward wing spar 100, aft wing spar 54, inboard tip rib 90 and outboard tip rib 92.

The location of the spindle gearbox 44 provides an efficient structural support for enduring operational loads by being mounted within the structural torque box. For example, when aircraft 10 is in helicopter mode, torque about mast axis 78 is reacted by the torque box. It should be noted that location of spindle gearbox 44 positions mast axis 78, while in helicopter mode, inboard of outboard tip rib 92, outboard of inboard tip rib 90, forward of aft spar 54 and aft of forward spar 100, which allows the axis of the torque to be inside of the torque box structure, rather than cantilevered outside of the torque box structure. In contrast, a spindle gearbox location outside (such as outboard, forward or aft) would cause a moment that would increase operational loading, thus requiring heavier and less efficient structural support.

Fixed gearbox 36 extends generally normal to conversion axis 50 and is coupled to the airframe by a support assembly preferably having multiple joints. In the illustrated embodiment, the support assembly includes a fixed joint depicted as a housing or bellmouth 102. As illustrated, housing 102 is a conical structure with oppositely disposed flanges configured to support bolted connections with fixed gearbox 36 and with outboard pillow block 84. In addition, the support assembly includes one or more directional reacting joints 104 that provide support between fixed gearbox 36 and the airframe of tiltrotor aircraft 10, only one of which being visible in FIG. 9. It is noted that fixed joint 102 is the primary support structure between fixed gearbox 36 and the airframe. This is significant because the support assembly is configured to maintain collinear alignment between fixed gearbox 36 and spindle gearbox 44. If the primary attachment structure was not common with the attachment structure of spindle gearbox 44, then operating parameters, such as loads, vibrations, thermal growth and the like, could increase the potential for misalignment therebetween. Preferably, directional reacting joints 104 form stiff connections in certain directions but a soft connection in a selected direction. For example, directional reacting joints 104 may provide stiff connections in the inboard/outboard and vertical directions, but a soft connection in the fore/aft direction or stiff connections in the inboard/outboard and fore/aft directions, but a soft connection in the vertical direction.

Power is transferred from an output gear 106 of fixed gearbox 36 to input gear 42 of spindle gearbox 44 through quill shaft 40. Quill shaft 40 is a floating shaft configured to accept certain misalignment due to manufacturing tolerances and operational effects between fixed gearbox 36 and rotating spindle gearbox 44. Quill shaft 40 is configured to be assembled and disassembled independently from fixed gearbox 36 and rotating spindle gearbox 44. As such, quill shaft 40 can be removed without removing either of fixed gearbox 36 or rotating spindle gearbox 44.

Figure 12:
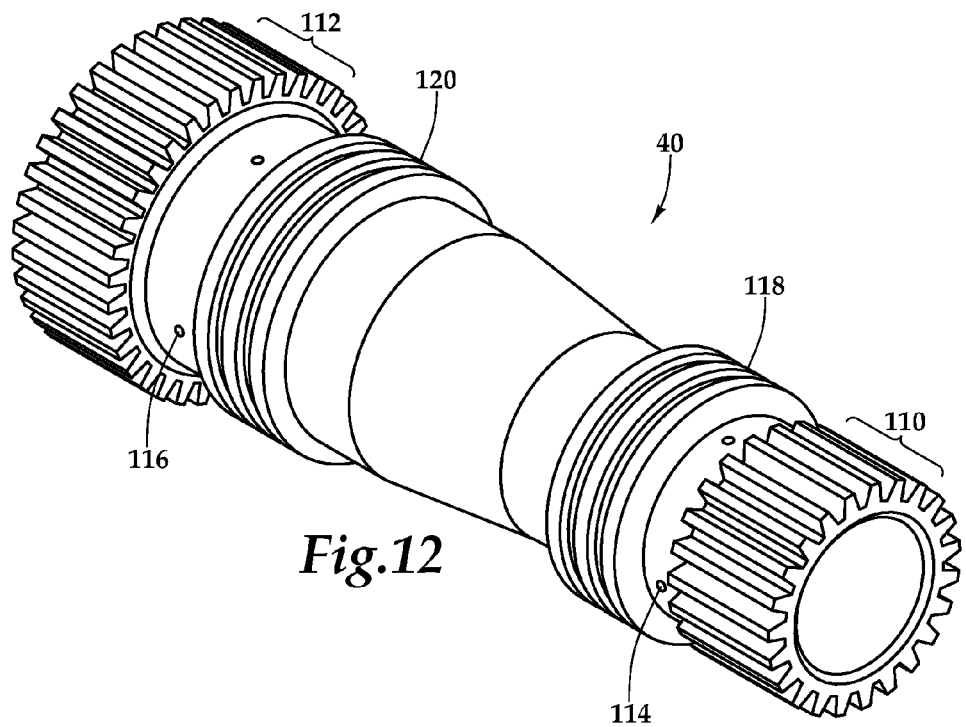
FIG. 12 is a perspective view of a quill shaft in accordance with embodiments of the present disclosure.
Figure 15A:
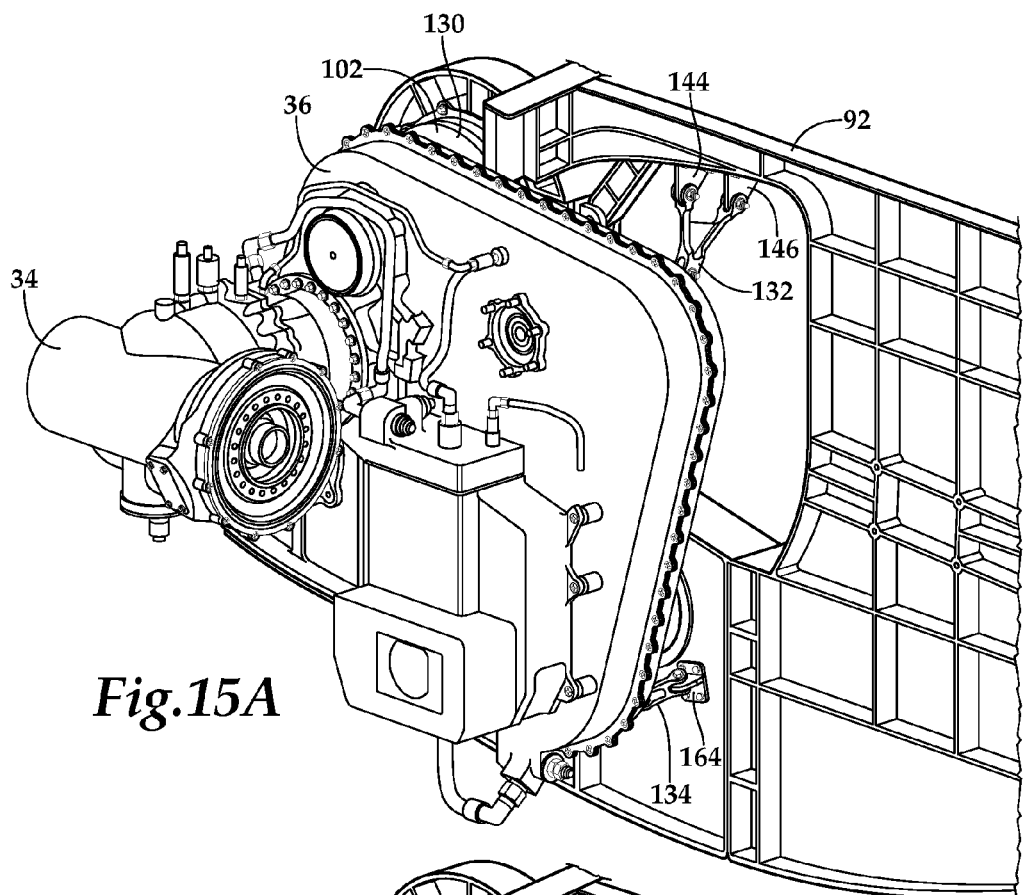
FIGS. 15A-15B are isometric views of a support assembly for a drive system of a tiltrotor aircraft in accordance with embodiments of the present disclosure.
Figure 15B:
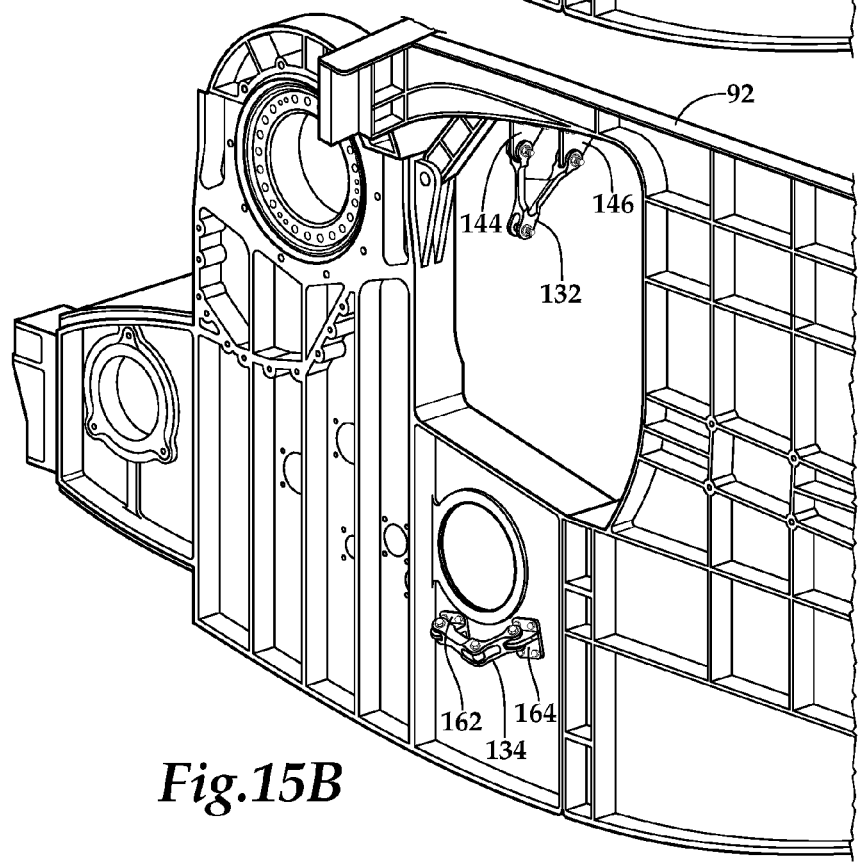

Referring also to FIGS. 12-14, quill shaft 40 has a first splined portion 110 and a second splined portion 112. In the illustrated embodiment, first splined portion 110 has a smaller diameter than second splined portion 112, thus first splined portion 110 is located inboard and second splined portion 112 is located outboard so that quill shaft 40 can be removed to the outboard direction for inspection/maintenance thereof. Quill shaft 40 includes one or more inboard lubrication ports 114 and outboard lubrication ports 116. Quill shaft 40 also includes a first set of o-ring glands 118 and a second set of o-ring glands 120.

During operation, second splined portion 112 is in torque engagement with output gear 106 of fixed gearbox 36 while first splined portion 110 is in torque engagement with input gear 42 of spindle gearbox 44. In the illustrated embodiment, first splined portion 110 and second splined portion 112 are crowned to promote teeth engagement in the event of collinear misalignment between spindle gearbox 44 and fixed gearbox 36. Lubrication oil is circulated to the mating surfaces of first splined portion 110 through inboard lubrication ports 114, the seals associated with the first set of o-ring glands 118 forcing the lubrication fluid to flow to the first splined portion 110 instead of flowing toward the center of quill shaft 40. Similarly, lubrication oil is circulated to the mating surfaces of the second splined portion 112 through outboard lubrication ports 116, the seals associated with the second set of o-ring glands 120 forcing the lubrication fluid to flow to second splined portion 112 instead of flowing toward the center of quill shaft 40.

One unique aspect of the configuration of quill shaft 40 in conjunction with spindle gearbox 44 and fixed gearbox 36 is that quill shaft 40 can be removed without removing either of the spindle gearbox 44 or fixed gearbox 36. An access cover 122 can be removed thereby accessing the second splined portion 112 of quill shaft 40. An interior portion 124 includes a feature, such as threads, for which a removal tool 126 can attach thereto. In one embodiment, interior portion 124 has female threads, while removal tool 126 has male threads that mate thereto. Upon attachment of removal tool 126, quill shaft 40 can be removed by pulling in an outboard direction along the centerline axis of quill shaft 40. Quill shaft 40 is critical for the operation of aircraft 10, as such, safety and efficiency of operation is improved by increasing the ease for which quill shaft 40 can be inspected.

Referring additionally to FIGS. 15A-16B, therein is depicted various views of a support assembly for a drive system of tiltrotor aircraft 10. The illustrated portion of the drive system includes spiral bevel gearbox 34 and fixed gearbox 36. As discussed herein, pylon assembly 24a including proprotor gearbox 46, mast 60 and proprotor assembly 26a is rotatable about conversion axis 50, which is the longitudinal axis of spindle gearbox 44, to selectively operate tiltrotor aircraft 10 between the helicopter mode and the airplane mode. To enable this conversion, spindle gearbox 44 is rotatably coupled to the airframe of tiltrotor aircraft 10 via inboard bearing assembly 86 of inboard pillow block 82 and outboard bearing assembly 88 of outboard pillow block 84. In this configuration, pylon assembly 24a is positioned inboard of engine 30 and above wing 18. Fixed gearbox 36 extends generally normal to conversion axis 50 of pylon assembly 24a and is coupled to the airframe of tiltrotor aircraft 10 via a support assembly including a plurality of joints.

During flight operations of tiltrotor aircraft 10, the shaft coupling spindle gearbox 44 to fixed gearbox 36, referred to herein as a common shaft or quill shaft 40, is rotatable about conversion axis 50 to drive input gear 42 of spindle gearbox 44 with torque and rotational energy from output gear 106 of fixed gearbox 36. During conversion operations of tiltrotor aircraft 10, spindle gearbox 44 rotates relative to fixed gearbox 36 about conversion axis 50, while fixed gearbox 36 remains generally stationary relative to the airframe. In addition, the operation of engine 30 generates significant heat, a portion of which transfers to fixed gearbox 36 due to the proximity of fixed gearbox 36 to engine 30. This heat, as well as heat generated due to the friction between the gears within fixed gearbox 36, results in thermal expansion cycles of fixed gearbox 36 wherein fixed gearbox 36 expands and contracts responsive to its thermal environment. To safely and efficiently achieve flight and conversion operations of tiltrotor aircraft 10, it is important that output gear 106 of fixed gearbox 36 remains in substantial collinear alignment with input gear 42 of spindle gearbox 44 even as fixed gearbox 36 experiences the thermal expansion cycles.

In the illustrated embodiment, the support assembly that couples fixed gearbox 36 to the airframe of tiltrotor aircraft 10 includes a fixed joint 130, a fore/aft reacting joint 132 and a vertical reacting joint 134. Fixed joint 130 is concentrically disposed about conversion axis 50. Fixed joint 130 includes bellmouth 102 that has a plurality of bolted connections with fixed gearbox 36 and a plurality of bolted connections with outboard pillow block 84 and/or outboard rib 92. By coupling fixed gearbox 36 to the airframe with fixed joint 130 that is concentrically disposed about conversion axis 50, fixed joint 130 is operable to support output gear 106 of fixed gearbox 36 in substantial collinear alignment with input gear 42 of spindle gearbox 44.

Figure 17A:
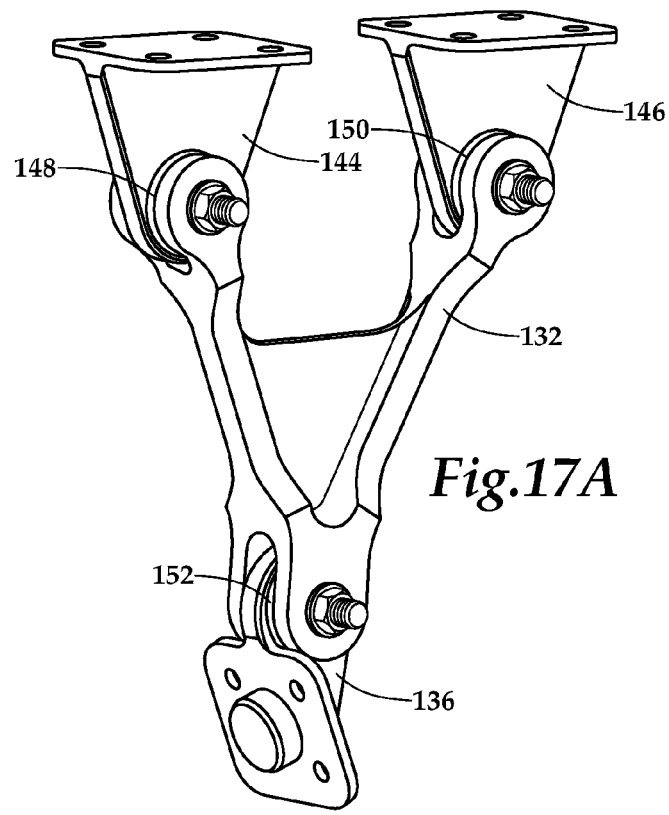
FIGS. 17A-17B are isometric views of A-frame connectors of a support assembly for a drive system of a tiltrotor aircraft in accordance with embodiments of the present disclosure.

Fore/aft reacting joint 132 secured fixed gearbox 36 to outboard rib 92 of the airframe of tiltrotor 10 at a location remote from conversion axis 50 in the fore/aft direction. In the illustrated embodiment, fore/aft reacting joint 132 is an A-frame connector that is bolted to a fitting 136, as best seen in FIG. 17A, of fixed gearbox 36 that is positioned along a radial axis 138 of fixed gearbox 36 which is offset from a fore/aft axis 140 of fixed gearbox 36 by angle 142. In addition, fore/aft reacting joint 132 is bolted to fittings 144, 146 of outboard rib 92. As illustrated, the connection between fore/aft reacting joint 132 and fitting 144 includes a spherical element 148, the connection between fore/aft reacting joint 132 and fitting 146 includes a spherical element 150 and the connection between fore/aft reacting joint 132 and fitting 136 includes a spherical element 152. Spherical elements 148, 150, 152 may be spherical bearings, spherical elastomeric members or the like and are preferably oriented generally normal to radial axis 138 and/or fore/aft axis 140. In this configuration, fore/aft reacting joint 132 provides stiff connections in the inboard/outboard direction and the vertical direction while providing a soft connection that is generally in the fore/aft direction. The soft connection enables fixed gearbox 36 at fitting 136 to move in the fore/aft direction relative to outboard rib 92 at fittings 144, 146. In operation, thermal expansion of fixed gearbox 36 causes fixed gearbox 36 to expand radially outwardly relative to conversion axis 50 as fixed joint 130 is concentrically disposed about conversion axis 50. As illustrated, fore/aft reacting joint 132 is not required to be completely normal to fore/aft axis 140 as long as the location of fore/aft reacting joint 132 is sufficiently remote from conversion axis 50 in the fore/aft direction and angle 142 is sufficiently small such that movement of fore/aft reacting joint 132 provides a radial growth degree of freedom or a thermal growth degree of freedom for fixed gearbox 36 relative to conversion axis 50 in the fore/aft direction of tiltrotor aircraft 10.

Figure 17B:
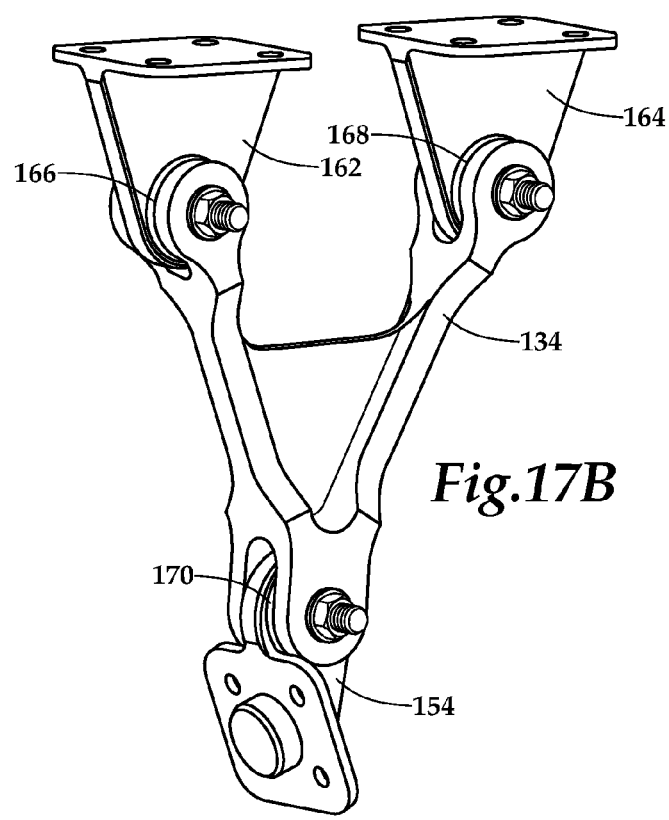

Vertical reacting joint 134 secured fixed gearbox 36 to outboard rib 92 of the airframe of tiltrotor 10 at a location remote from conversion axis 50 in the vertical direction. In the illustrated embodiment, vertical reacting joint 134 is an A-frame connector that is bolted to a fitting 154, as best seen in FIG. 17B, of fixed gearbox 36 that is positioned along a radial axis 156 of fixed gearbox 36 which is offset from a vertical axis 158 of fixed gearbox 36 by angle 160. In addition, vertical reacting joint 134 is bolted to fittings 162, 164 of outboard rib 92. As illustrated, the connection between vertical reacting joint 134 and fitting 162 includes a spherical element 166, the connection between vertical reacting joint 134 and fitting 164 includes a spherical element 168 and the connection between vertical reacting joint 134 and fitting 154 includes a spherical element 170. Spherical elements 166, 168, 170 are preferably oriented generally normal to radial axis 156 and/or fore/aft axis 158. In this configuration, vertical reacting joint 134 provides stiff connections in the inboard/outboard direction and the fore/aft direction while providing a soft connection that is generally in the vertical direction. The soft connection enables fixed gearbox 36 at fitting 154 to move in the vertical direction relative to outboard rib 92 at fittings 162, 164. In operation, thermal expansion of fixed gearbox 36 causes fixed gearbox 36 to expand radially outwardly relative to conversion axis 50 as fixed joint 130 is concentrically disposed about conversion axis 50. As illustrated, vertical reacting joint 134 is not required to be completely normal to vertical axis 158 as long as the location of vertical reacting joint 134 is sufficiently remote from conversion axis 50 in the vertical direction and angle 160 is sufficiently small such that movement of vertical reacting joint 134 provides a radial growth degree of freedom or a thermal growth degree of freedom for fixed gearbox 36 relative to conversion axis 50 in the vertical direction of tiltrotor aircraft 10.

Figure 16A:
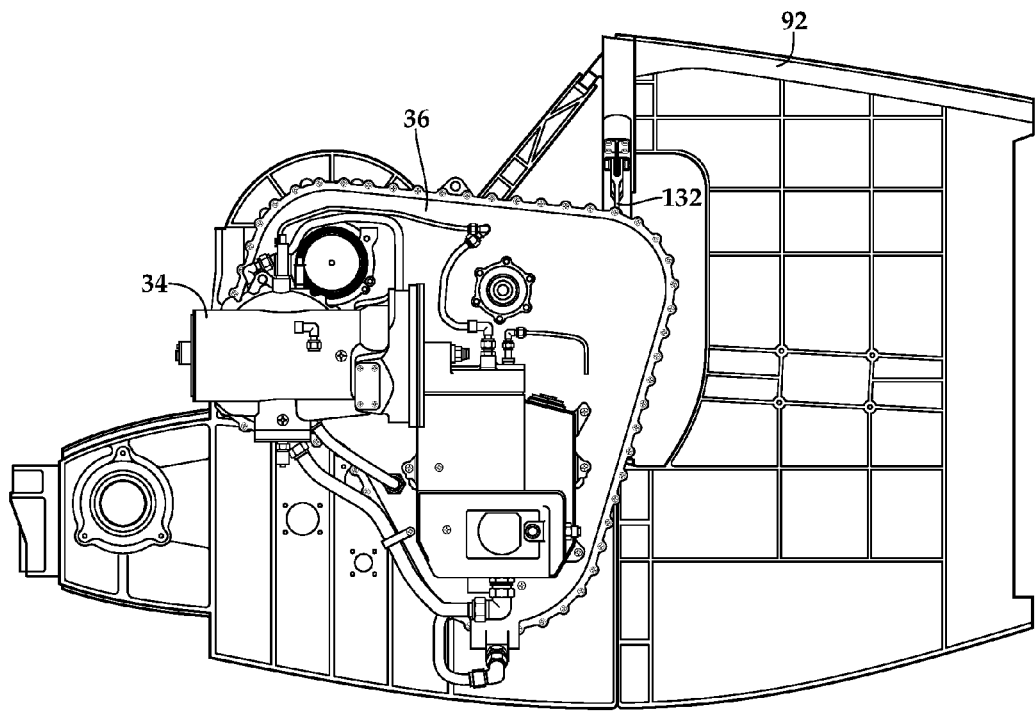
FIGS. 16A-16B are side views of a support assembly for a drive system of a tiltrotor aircraft in accordance with embodiments of the present disclosure.
Figure 16B:
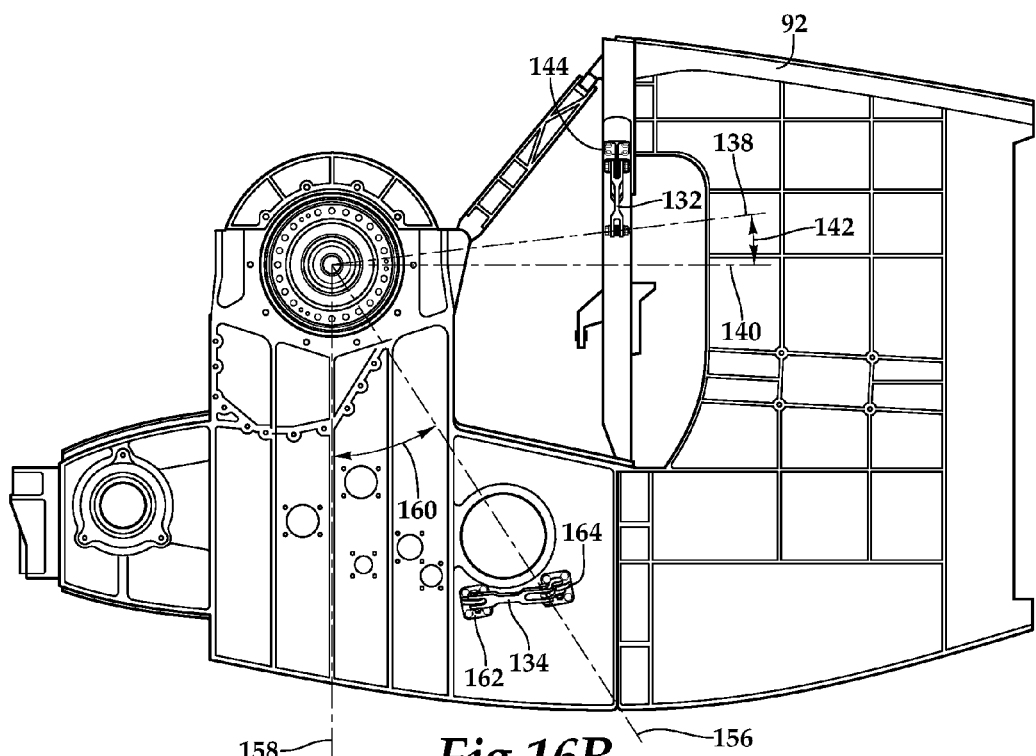

In the illustrated embodiment, fixed joint 130, fore/aft reacting joint 132 and vertical reacting joint 134 provide lateral support to fixed gearbox 36, that is, support in the direction in and out of the page in FIGS. 16A-16B. In addition, fixed joint 130 and fore/aft reacting joint 132 provide support to fixed gearbox 36 in the vertical direction while fixed joint 130 and vertical reacting joint 134 provide support to fixed gearbox 36 in the fore/aft direction. Using this configuration of fixed joint 130, fore/aft reacting joint 132 and vertical reacting joint 134 as a support assembly for fixed gearbox 36 maintains output gear 106 of fixed gearbox 36 in substantial collinear alignment with input gear 42 of spindle gearbox 44 throughout thermal expansion cycles of fixed gearbox 36.

While the support assembly for fixed gearbox 36 has been depicted and described as having fore/aft reacting joint 132 and vertical reacting joint 134, it should be understood by those having ordinary skill in the art that a support assembly for a fixed gearbox of the present disclosure could have other configurations of reacting joints that correspond to combinations of directions other than the fore/aft and vertical directions depending upon the size and shape of the fixed gearbox as well as the available connection points to the airframe. In addition, it should be understood by those having ordinary skill in the art that a support assembly for a fixed gearbox of the present disclosure could have other orientations of reacting joints that do not correspond to directions that are generally normal to each other including, for example, reacting joints at directions separated by less than ninety degrees or other non parallel directions are possible and are considered to be within the scope of the present disclosure. Further, even though fore/aft reacting joint 132 and vertical reacting joint 134 have been depicted and described as A-frame connectors, it should be understood by those having ordinary skill in the art that reacting joints of the present disclosure could have many forms including elastomeric mounts, link connectors, slidable connectors and hinged connectors, to name a few.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drive system for a tiltrotor aircraft including an airframe and having a helicopter mode and an airplane mode, the drive system comprising:
    a first gearbox rotatably coupled to the airframe and having an input gear, the first gearbox rotatable about a longitudinal axis to selectively operate the tiltrotor aircraft between the helicopter mode and the airplane mode;
    a second gearbox having an output gear, the second gearbox extending generally normal to the longitudinal axis of the first gearbox;
    a common shaft configured to transfer torque from the output gear of the second gearbox to the input gear of the first gearbox, the common shaft rotatable about the longitudinal axis; and
    a support assembly coupling the second gearbox to the airframe, the support assembly including a fixed joint proximate the longitudinal axis, a first directional reacting joint remote from the longitudinal axis providing a first radial growth degree of freedom to the second gearbox relative to the longitudinal axis and a second directional reacting joint remote from the longitudinal axis providing a second radial growth degree of freedom to the second gearbox relative to the longitudinal axis;
    wherein, the first radial growth degree of freedom is not parallel with the second radial growth degree of freedom; and
    wherein, the support assembly maintains the output gear of the second gearbox in substantial collinear alignment with the input gear of the first gearbox.

2. The drive system as recited in claim 1 wherein the fixed joint further comprises a bolted connection.

3. The drive system as recited in claim 1 wherein the first directional reacting joint further comprises an A-frame connector having spherical elements generally normal to the first radial growth degree of freedom of the second gearbox.

4. The drive system as recited in claim 1 wherein the second directional reacting joint further comprises an A-frame connector having spherical elements generally normal to the second radial growth degree of freedom of the second gearbox.

5. The drive system as recited in claim 1 wherein the fixed joint, the first directional reacting joint and the second directional reacting joint provide lateral support to the second gearbox.

6. The drive system as recited in claim 1 wherein the fixed joint and the first directional reacting joint provide support to the second gearbox in a direction generally parallel to the second radial growth degree of freedom.

7. The drive system as recited in claim 1 wherein the fixed joint and the second directional reacting joint provide support to the second gearbox in a direction generally parallel to the first radial growth degree of freedom.

8. The drive system as recited in claim 1 wherein the first radial growth degree of freedom further comprises a first thermal growth degree of freedom and wherein the second radial growth degree of freedom further comprises a second thermal growth degree of freedom.

9. The drive system as recited in claim 1 wherein the first radial growth degree of freedom is generally normal to the second radial growth degree of freedom.

10. The drive system as recited in claim 1 wherein the first radial growth degree of freedom is generally in a fore/aft direction and wherein the second radial growth degree of freedom is generally in a vertical direction.

11. The drive system as recited in claim 1 wherein the support assembly maintains the output gear of the second gearbox in substantial collinear alignment with the input gear of the first gearbox throughout thermal expansion cycles of the second gearbox.

12. A tiltrotor aircraft having a helicopter mode and an airplane mode, the tiltrotor aircraft comprising:
an airframe including a fuselage and a wing;
an engine supported by the airframe proximate an outboard end of the wing;
a pylon assembly coupled to the airframe inboard of the engine and above the wing, the pylon assembly including a spindle gearbox having an input gear, a mast and a proprotor assembly operable to rotate with the mast, the spindle gearbox rotatable about a conversion axis to selectively operate the tiltrotor aircraft between the helicopter mode and the airplane mode;
a fixed gearbox operably coupled to the engine and having an output gear, the fixed gearbox extending generally normal to the conversion axis of the spindle gearbox;
a common shaft configured to transfer torque from the output gear of the fixed gearbox to the input gear of the spindle gearbox, the common shaft rotatable about the conversion axis; and
a support assembly coupling the fixed gearbox to the airframe, the support assembly including a fixed joint proximate the conversion axis, a first directional reacting joint remote from the conversion axis providing a first radial growth degree of freedom to the fixed gearbox relative to the conversion axis and a second directional reacting joint remote from the conversion axis providing a second radial growth degree of freedom to the fixed gearbox relative to the longitudinal axis;
wherein, the first radial growth degree of freedom is not parallel with the second radial growth degree of freedom; and
wherein, the support assembly maintains the output gear of the fixed gearbox in substantial collinear alignment with the input gear of the spindle gearbox.

13. The tiltrotor aircraft as recited in claim 12 wherein the fixed joint further comprises a bolted connection, wherein the first directional reacting joint further comprises an A-frame connector having spherical elements generally normal to the first radial growth degree of freedom of the fixed gearbox and wherein the second directional reacting joint further comprises an A-frame connector having spherical elements generally normal to the second radial growth degree of freedom of the fixed gearbox.

14. The tiltrotor aircraft as recited in claim 12 wherein the fixed joint, the first directional reacting joint and the second directional reacting joint provide lateral support to the fixed gearbox, wherein the fixed joint and the first directional reacting joint provide support to the fixed gearbox in a direction generally parallel to the second radial growth degree of freedom and wherein the fixed joint and the second directional reacting joint provide support to the fixed gearbox in a direction generally parallel to the first radial growth degree of freedom.

15. The tiltrotor aircraft as recited in claim 12 wherein the first radial growth degree of freedom further comprises a first thermal growth degree of freedom, wherein the second radial growth degree of freedom further comprises a second thermal growth degree of freedom and wherein the support assembly maintains the output gear of the fixed gearbox in substantial collinear alignment with the input gear of the spindle gearbox throughout thermal expansion cycles of the fixed gearbox.

16. The tiltrotor aircraft as recited in claim 12 wherein the first radial growth degree of freedom is generally in a fore/aft direction and wherein the second radial growth degree of freedom is generally in a vertical direction.

17. A method of maintaining substantial collinear alignment throughout thermal expansion cycles of a drive system of a tiltrotor aircraft having a helicopter mode and an airplane mode, the method comprising:
rotatably coupled a first gearbox to an airframe such that the first gearbox is rotatable about a longitudinal axis to selectively operate the tiltrotor aircraft between the helicopter mode and the airplane mode;
positioning a second gearbox generally normal to the longitudinal axis of the first gearbox;
transferring torque from an output gear of the second gearbox to an input gear of the first gearbox with a common shaft rotatable about the longitudinal axis; and
coupling the second gearbox to the airframe with a fixed joint proximate the longitudinal axis, a first directional reacting joint remote from the longitudinal axis providing a first radial growth degree of freedom to the second gearbox relative to the longitudinal axis and a second directional reacting joint remote from the longitudinal axis providing a second radial growth degree of freedom to the second gearbox relative to the longitudinal axis, thereby maintaining the output gear of the second gearbox in substantial collinear alignment with the input gear of the first gearbox throughout thermal expansion cycles of the second gearbox.

18. The method as recited in claim 17 further comprising providing lateral support to the second gearbox with the fixed joint, the first directional reacting joint and the second directional reacting joint.

19. The method as recited in claim 17 further comprising providing support to the second gearbox in a direction generally parallel to the second radial growth degree of freedom with the fixed joint and the first directional reacting joint.

20. The method as recited in claim 17 further comprising providing support to the second gearbox in a direction generally parallel to the first radial growth degree of freedom with the fixed joint and the second directional reacting joint.

* * * * *